United States Patent
Kim et al.

(10) Patent No.: US 12,425,745 B2
(45) Date of Patent: Sep. 23, 2025

(54) METHOD AND SYSTEM FOR PROCESSING AN IMAGE OF A VEHICLE

(71) Applicants: HYUNDAI MOTOR COMPANY, Seoul (KR); KIA CORPORATION, Seoul (KR)

(72) Inventors: Gyun Ha Kim, Incheon (KR); Dong Hyuk Jeong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 115 days.

(21) Appl. No.: 18/126,209

(22) Filed: Mar. 24, 2023

(65) Prior Publication Data

US 2024/0040267 A1 Feb. 1, 2024

(30) Foreign Application Priority Data

Jul. 27, 2022 (KR) ........................ 10-2022-0093004

(51) Int. Cl.
*H04N 23/81* (2023.01)
*H04N 23/71* (2023.01)
*H04N 23/84* (2023.01)

(52) U.S. Cl.
CPC ............. *H04N 23/81* (2023.01); *H04N 23/71* (2023.01); *H04N 23/84* (2023.01)

(58) Field of Classification Search
None
See application file for complete search history.

(56) References Cited

U.S. PATENT DOCUMENTS

| | | | | |
|---|---|---|---|---|
| 7,948,524 | B2* | 5/2011 | Endo | H04N 23/611 348/222.1 |
| 2011/0157402 | A1* | 6/2011 | Kitajima | H04N 5/142 348/222.1 |
| 2014/0168463 | A1* | 6/2014 | Tamura | H04N 23/88 348/223.1 |
| 2016/0182837 | A1* | 6/2016 | Shiokawa | H04N 25/135 348/164 |
| 2016/0341848 | A1* | 11/2016 | Nakamura | G06V 20/56 |
| 2018/0060675 | A1* | 3/2018 | Ji | H04N 23/75 |
| 2019/0281202 | A1* | 9/2019 | Chen | H04N 23/23 |
| 2020/0213581 | A1* | 7/2020 | Lu | G06T 7/0002 |
| 2022/0098473 | A1* | 3/2022 | Kasori | C08G 18/758 |
| 2022/0191449 | A1* | 6/2022 | Matsubara | H04N 9/77 |

OTHER PUBLICATIONS

Title: Tone Mapping Web: https://web.archive.org/web/20150316175835/https://en.wikipedia.org/wiki/Tone_mapping (Year: 2015).*

* cited by examiner

*Primary Examiner* — Twyler L Haskins
*Assistant Examiner* — Wesley J Chiu
(74) *Attorney, Agent, or Firm* — Lempia Summerfield Katz LLC

(57) ABSTRACT

An image processing method of a vehicle includes identifying an intensity of light emitted to the vehicle based on an output value of an illuminance sensor of the vehicle, obtaining an image through a camera of the vehicle, identifying whether sunlight is backlight for the camera of the vehicle based on at least one of an output value of a sunlight sensor of the vehicle or the image obtained through the camera of the vehicle, and changing a color attribute of the image based on the intensity of the light and the sunlight being the backlight.

12 Claims, 13 Drawing Sheets

(a)  (b)

METHOD AND SYSTEM FOR PROCESSING AN IMAGE OF A VEHICLE

CROSS-REFERENCE TO RELATED APPLICATION

The present application claims priority to Korean Patent Application No. 10-2022-0093004, filed on Jul. 27, 2022, the entire contents of which is incorporated herein for all purposes by this reference.

BACKGROUND OF THE PRESENT DISCLOSURE

Technical Field

The present disclosure relates to an image processing method and a system of a vehicle for processing an image obtained by a camera of the vehicle, particularly, a camera of a driving image recording system.

Description of Related Art

FIGS. 1A, 1B, 2A and 2B are images obtained by a camera of a driving image recording system of a vehicle according to the related art.

A glare may occur in a camera of a driving image recording system that is installed inside a vehicle and captures an image in an outward direction of the vehicle, i.e., in a direction of a windshield glass of the vehicle, due to an angle of the windshield glass. The glare may occur variably by influences such as the intensity of sunlight, the direction of sunlight, the weather, and/or the driving direction of the vehicle.

For example, referring to FIG. 1A, a glare 11 appears in an image obtained by a camera.

To improve such a glare issue, a polarizing filter is applied to the camera according to the related art.

For example, referring to FIG. 1B, compared to the image of FIG. 1A, the glare 11 is removed in an image obtained through the camera to which the polarizing filter is applied according to the related art.

However, the application of the polarizing filter to the camera according to the related art may have an issue of a rainbow occurring due to a tinting film (or a window tinting film) provided on a windshield glass of a vehicle to block sunlight and heat.

For example, an image obtained by the camera to which the polarizing filter is not applied does not include a rainbow pattern as shown in FIG. 2A, while an image obtained by the camera to which the polarizing filter is applied includes a rainbow pattern as shown in FIG. 2B.

The sunlight outside the Earth's atmosphere is not polarized, but the sunlight in the Earth's atmosphere is slightly polarized. Thus, when the sunlight, or light, passes through a material having birefringence, for example, a tinting film, a phenomenon may occur in which the light is refracted in two directions due to a difference in the traveling speed of the light in a polarized state of the light. In this case, light that follows the law of normal refraction is referred to as an ordinary ray (O-ray), and light with abnormal refraction is referred to as an extraordinary ray (E-ray).

According to these properties of light, when light passes through a material having birefringence, for example, a tinting film attached onto a windshield glass of a vehicle, a phenomenon occurs in which the light is refracted in two directions, and a rainbow may thereby occur in a camera of a driving image recording system that captures an image in the direction of the windshield glass. For example, the camera of the driving image recording system may thus output an image including a rainbow pattern.

The rainbow pattern may be formed as an irregular moiré pattern, for example. Such an irregular moiré pattern may be formed in various colors in a visible light area because the tinting film may be slightly different in thickness of each part.

SUMMARY

An object of the present disclosure is to provide an image processing method and system of a vehicle that may prevent a glare and a rainbow from occurring in a camera of a driving image recording system that is installed inside the vehicle and captures an image outside in front of the vehicle, i.e., in a direction of a windshield glass of the vehicle.

For example, the image processing method and system may prevent a rainbow that may occur by the application of a polarizing filter to the camera of the driving image recording system in the related art.

For example, the vehicle image processing method and system may minimize a rainbow by adjusting a color of an obtained image under a condition where the rainbow may occur. The vehicle image processing method and system may also maintain the definition of the obtained image by adjusting saturation under a condition where the rainbow does not occur.

Additional advantages, objects, and features of the present disclosure are set forth in part in the description that follows and in part should become apparent to those having ordinary skill in the art upon examination of the following or may be learned from practice of the disclosure. The objects and other advantages of the disclosure may be realized and attained by the structure particularly pointed out in the written description and claims hereof as well as the appended drawings.

According to an example embodiment, there is provided an image processing method that is performed in a vehicle by a processor executing a program stored in a memory. The method includes identifying an intensity of light emitted to the vehicle based on an output value of an illuminance sensor of the vehicle, obtaining an image through a camera of the vehicle, identifying whether sunlight is backlight for the camera of the vehicle, based on at least one of an output value of a sunlight sensor of the vehicle or the image obtained through the camera of the vehicle, and changing a color attribute of the image based on the intensity of the light and the sunlight being the backlight.

The identifying whether the sunlight is the backlight for the camera may include: determining whether the sunlight is emitted within a preset angle range of the vehicle, based on the output value of the sunlight sensor; and when the sunlight is emitted within the preset angle range of the vehicle, determining that the sunlight is the backlight for the camera.

The identifying whether the sunlight is the backlight for the camera may include: determining whether a sun is included in the image based on an object detection algorithm; and when the sun is included in the image, determining that the sunlight is the backlight for the camera.

The changing the color attribute of the image may include: determining whether the intensity of the light is greater than a preset first threshold value; and changing the color attribute of the image in response to the intensity of the light being greater than the preset first threshold value.

The changing the color attribute of the image may include reducing saturation of the image based on a comparison of the intensity of the light and a preset second threshold value.

The saturation of the image may be reduced by reducing, by a preset ratio or a preset value, a color value of each pixel of the image corresponding to each of one or more predefined colors.

The reducing the saturation may include: when the intensity of the light is less than the preset second threshold value, reducing the saturation of the image by one level; and when the intensity of the light is greater than or equal to the preset second threshold value, reducing the saturation of the image by two levels. The reducing by one level may be performed by reducing a color value of each pixel of the image corresponding to each of the predefined colors by a preset first ratio or first value. The reducing by two levels may be performed by reducing a color value of each pixel of the image corresponding to each of the predefined colors by a preset second ratio or second value. An absolute value of the preset first ratio or first value may be less than an absolute value of the preset second ratio or second value.

The predefined colors may include at least one of red, blue, green, magenta, yellow, cyan, or white, in a red, blue, green (RGB) color system.

A polarizing filter may be arranged on a front surface portion or a rear surface portion of a lens of the camera such that the polarizing filter is applied to a preset lower end portion of the front surface portion or a preset lower end portion of the rear surface portion.

The image processing method may further include identifying a current point of time, and the changing the color attribute of the image may be performed when the current point of time is out of a preset nighttime range.

According to another example embodiment, there is provided an image processing system of a vehicle including: an illuminance sensor; a sunlight sensor; a camera configured to obtain an image around the vehicle; and a controller configured to identify an intensity of light emitted to the vehicle based on an output value of the illuminance sensor, identify whether sunlight is backlight for the camera based on at least one of an output value of the sunlight sensor or the image, and change a color attribute of the image based on the sunlight being backlight.

The controller may be configured to: determine whether the sunlight is emitted within a preset angle range of the vehicle based on the output value of the sunlight sensor; and when the sunlight is emitted within the preset angle range, determine that the sunlight is the backlight for the camera.

The controller may be configured to: determine whether a sun is included in the image based on an object detection algorithm; and when the sun is included in the image, determine that the sunlight is the backlight for the camera.

The controller may be configured to: determine whether the intensity of the light is greater than a preset first threshold value; and change the color attribute of the image in response to the intensity being greater than the preset first threshold value.

The controller may be configured to reduce saturation of the image based on a comparison of the intensity of the light and a preset second threshold value.

The controller may be configured to reduce the saturation of the image by reducing, by a preset ratio or value, a color value of each pixel of the image corresponding to each of one or more predefined colors.

The controller may be configured to: when the intensity of the light is less than the preset second threshold value, reduce the saturation of the image by one level by reducing a color value of each pixel of the image corresponding to each of the predefined colors by a preset first ratio or first value; and when the intensity of the light is greater than or equal to the preset second threshold value, reduce the saturation of the image by two levels by reducing a color value of each pixel of the image corresponding to each of the predefined colors by a preset second ratio or second value. An absolute value of the preset first ratio or first value may be less than an absolute value of the preset second ratio or second value.

The predefined colors may be at least one of red, blue, green, magenta, yellow, cyan, or white, in an RGB color system.

A polarizing filter may be arranged on a front surface portion or a rear surface portion of a lens of the camera such that the polarizing filter is applied to a preset lower end portion of the front surface portion or a preset lower end portion of the rear surface portion.

The controller may be configured to identify a current point of time in response to time information being received; and change the color attribute of the image when the current point of time is out of a preset nighttime range.

According to example embodiments described herein, an image processing method and system of a vehicle may prevent a rainbow that may occur by the application of a polarizing filter to a camera of a driving image recording system in the related art.

For example, the image processing method and system may minimize a rainbow by adjusting a color of an obtained image under a condition where the rainbow may occur, and may also maintain the definition of the obtained image by adjusting saturation under a condition where the rainbow does not occur.

DETAILED DESCRIPTION

Figure 1A:
FIGS. 1A, 1B, 2A and 2B are images obtained by a camera of a vehicle driving image recording system according to the related art.
Figure 1B:
Figures 2A, 2B:
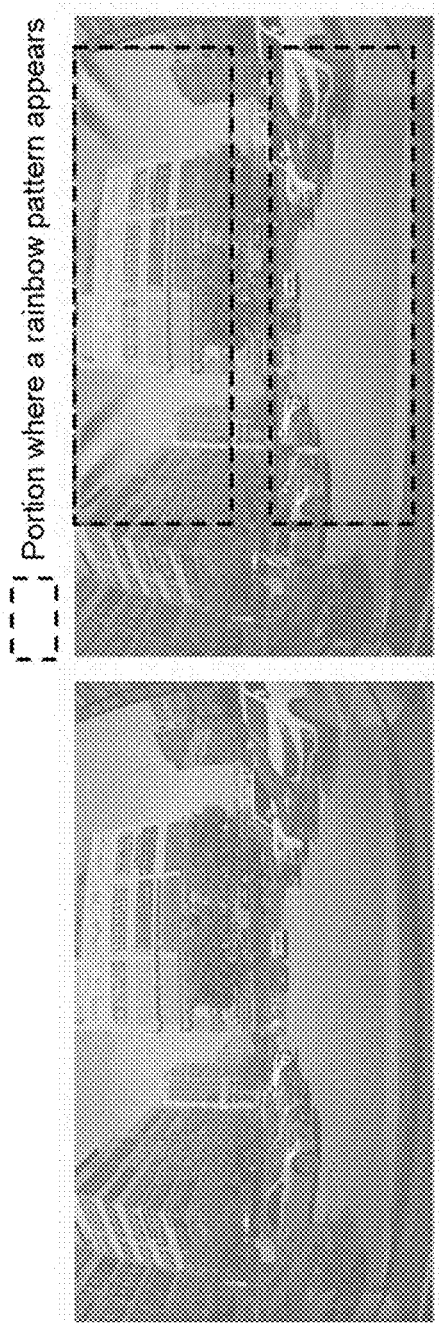

Hereinafter, example embodiments of the present disclosure are described in detail with reference to the accompanying drawings, and the same or similar elements are given the same reference numerals regardless of reference symbols, and redundant descriptions thereof have been omitted. In the following description, the terms "unit," "module," and "device" may be implemented as software or hardware. A plurality of units, modules, or devices may be implemented as a single element, and a single unit, module, or device may include a plurality of elements.

Throughout the disclosure, when an element is described as being "on," "under," "connected to," or "coupled to" another element, it may be directly "on," "under," "connected to," or "coupled to" the other element, or there may be one or more other elements intervening therebetween.

In addition, it is to be understood that a term such as "include" or "have" is intended to designate that elements described herein are present and does not preclude the possibility or presence of additional one or more other elements.

Although terms including ordinal numbers, such as "first," "second," and the like, may be used herein to describe various elements, the elements are not limited by these terms and these terms are generally used to distinguish one element from another.

A singular expression includes the plural form unless the context clearly dictates otherwise.

A reference numeral or identification number used herein to describe each step for the convenience of description is not to limit the order of each step to a specific order, but steps may also be performed in different order unless otherwise defined.

Hereinafter, the operational principle and example embodiments of the present disclosure are described with reference to the accompanying drawings.

Figure 3A:
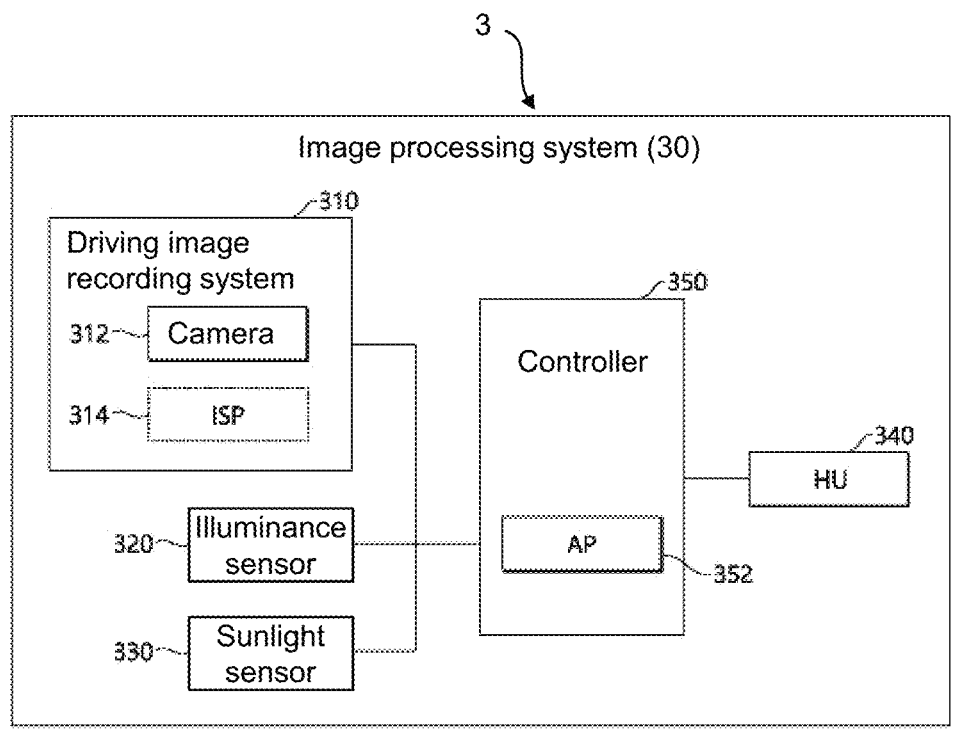
FIGS. 3A and 3B are block diagrams illustrating examples of a vehicle according to an example embodiment.
Figure 3B:
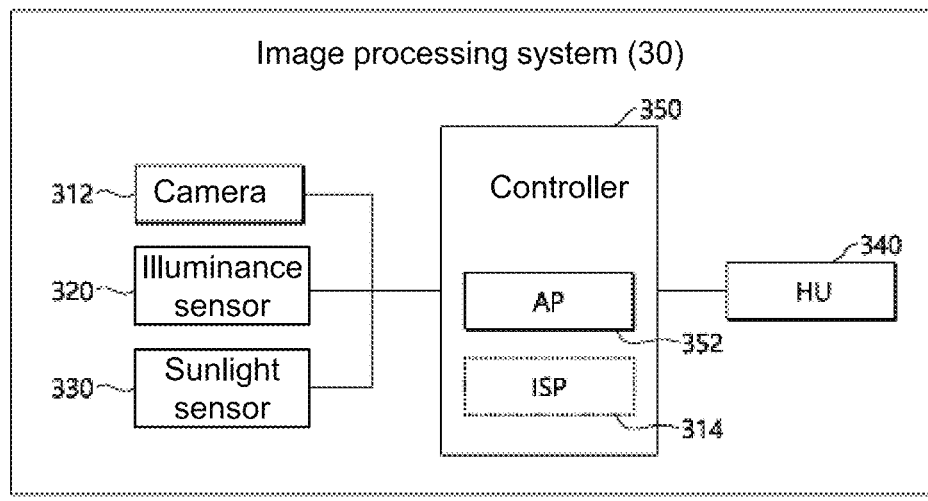

FIGS. 3A and 3B are block diagrams illustrating examples of a vehicle according to an example embodiment.

Referring to FIG. 3A, an image processing system 30 of a vehicle 3 may include a driving image recording system 310, an illuminance sensor 320, a sunlight sensor 330, a head unit (HU) 340, and/or a controller 350.

The driving image recording system 310 may include a camera 312 and/or an image signal processor (ISP) 314.

The camera 312 may obtain a forward-looking image of the vehicle 3. For example, the camera 312 may be installed in the front of the vehicle 3 such that it is able to obtain an image in a direction of a windshield glass of the vehicle 3.

The ISP 314 may perform image processing. In addition, although not shown, the ISP 314 may include a memory (not shown) to store therein the obtained image, an image obtained through image processing, and/or various pieces of data used in the ISP 314.

For example, the ISP 314 may change a color attribute (e.g., saturation, hue and the like) of at least a portion of the image received from the camera 312 under the control of the controller 350.

For example, the driving image recording system 310 may record (also referred to herein as obtain) images during the driving and parking of the vehicle 3 and in the case of an occurrence of an event.

The illuminance sensor 320 may measure an intensity of light and output a value corresponding to the measured intensity of light.

For example, the illuminance sensor 320 may be installed in any one portion of the vehicle 3 to measure an intensity of light emitted to the vehicle 3.

For example, the illuminance sensor 320 may be provided inside an integrated sensor (not shown) of the vehicle 3 arranged at an upper end of the windshield glass of the vehicle 3 or may be arranged at an upper end of a dashboard (also referred to as a lower end of the windshield glass) of the vehicle 3.

The sunlight sensor 330 (also referred to as a sun tracking sensor) may include a plurality of infrared sensors and may identify (or track) a position of sunlight based on output values of the infrared sensors. For example, the sunlight sensor 330 may divide zones and recognize an intensity of sunlight, determine (or track) the position of sunlight based on the recognized intensity of sunlight, and output the determined position.

For example, the sunlight sensor 330 may be installed in any one portion of the vehicle 3 to determine the position of sunlight emitted to the vehicle 3, for example, to the front of the vehicle 3, and output a value corresponding to the determined position of sunlight.

The HU 340 may provide time information to the controller 350.

The controller 350 (also referred to as a processor or a control circuit) may include at least one device of the vehicle 3, for example, the driving image recording system 310, the illuminance sensor 320, the sunlight sensor 330, and/or the HU 340.

For example, the controller 350 may control a power supply device (not shown) of the vehicle 3 to supply power to at least one device of the vehicle 3.

For example, the controller 350 may control the ISP 314 to change a color attribute of the image received from the driving image recording system 310, based on the image received from the driving image recording system 310, the value output from the sunlight sensor 330, the value output from the illuminance sensor 320, and/or the time information received from the HU 340.

The controller 350 may include an application processor (AP) 352 (also referred to as a processor).

The AP 352 may perform various types of data processing (e.g., signal processing and the like) and operations.

Although not shown, the controller 350 may include a memory.

The memory (not shown) may store various sets of data used in the controller 350, for example, a software program and input data and/or output data for instructions related to the software program. The memory may also store data received from an external device, data obtained by the controller 350, and/or data output from the controller 350.

For example, the memory may store an algorithm (e.g., an object detection algorithm or a deep learning algorithm) for recognizing the sun included in an image, and the AP 352 may execute the algorithm to determine whether the sun is included in the image.

Referring to FIG. 3B, the image processing system 30 of the vehicle 3 may include the camera 312, the illuminance sensor 320, the sunlight sensor 330, the HU 340, and/or the controller 350. The controller 350 may include the AP 352 and the ISP 314.

The camera 312 and the ISP 314 of FIG. 3B may be arranged differently from the arrangement of the image processing system 30 shown in FIG. 3A and implemented accordingly. For example, unlike the arrangement shown in FIG. 3A, the camera 312 and the ISP 314 of FIG. 3B may not be included as elements of the driving image recording system 310, but the camera 312 may be included as an element of the vehicle 3 and the ISP 314 may be included in the controller 350.

The image processing system 30 of the vehicle 3 of FIG. 3B is implemented to be different only in some of the elements from that shown in FIG. 3A, but the elements thereof may perform the same or similar operations as the corresponding elements having the same identification numbers and names shown in FIG. 3A. Accordingly, reference may be made to the operations of each element of the image processing system 30 of the vehicle 3 described in detail with reference to FIG. 3A, and a detailed and repeated description of each element of the image processing system 30 of the vehicle 3 of FIG. 3B has been omitted here for conciseness.

In addition, a polarizing filter (also referred to as a polarizing film) may be applied to the camera 312 shown in FIGS. 3A and 3B to prevent glares in the camera 312.

Figure 4:
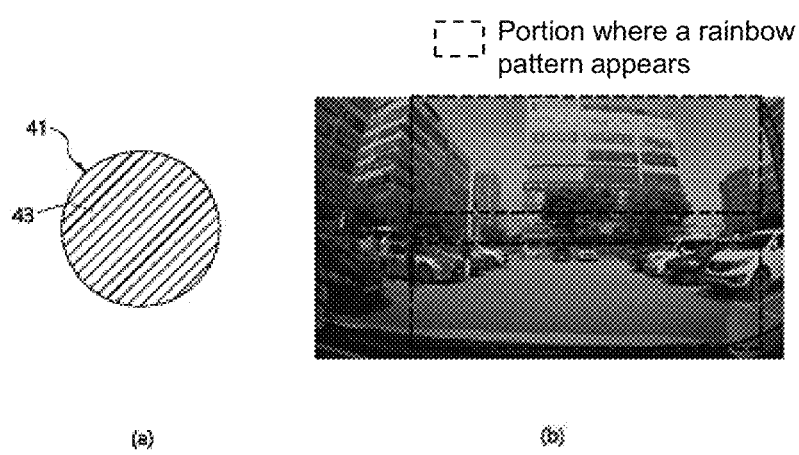
FIG. 4 illustrates a polarizing filter applied to a camera according to the related art.

FIG. 4 illustrates a polarizing filter applied to a camera according to the related art.

Figure 5:
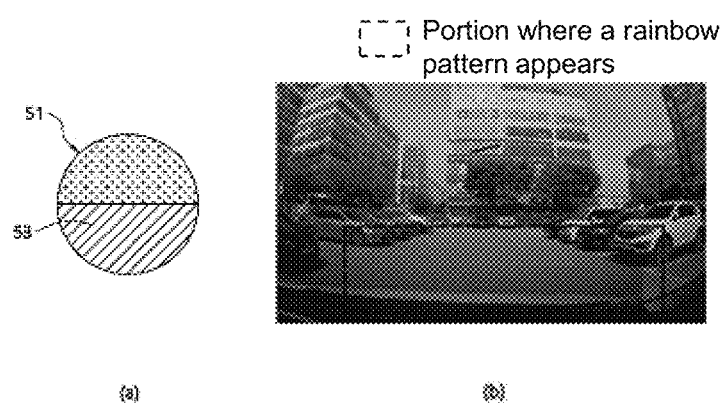
FIG. 5 illustrates a polarizing filter applied to a camera according to an example embodiment.

FIG. 5 illustrates a polarizing filter applied to a camera according to an example embodiment.

Referring to FIG. 4, according to the related art, a polarizing filter 43 may be applied to an entire surface of a front portion or a rear portion of a lens 41 included in a camera, as shown in view (a) of FIG. 4.

Accordingly, there has been an issue in the related art that a rainbow pattern occurs in various areas in an image obtained through the camera as shown in view (b) of FIG. 4.

According to an example embodiment of the present disclosure, a polarizing filter 53 may be arranged such that the polarizing filter 53 is applied to a preset lower end of a front portion or a preset lower end of a rear portion of a lens 51 included in the camera 312, as shown in FIG. 5. For example, the polarizing filter 53 may be arranged such that the polarizing filter 53 is applied to 50% of an entire surface of the front portion or the rear portion of the lens 51.

Accordingly, according to an example embodiment, a rainbow may occur only at a lower end of an image corresponding to the lower end at which the polarizing filter 53 is arranged as shown in view (b) of FIG. 5, in contrast to the related art where a rainbow occurs in various areas in an image obtained by applying the polarizing filter 43 as shown in FIG. 4.

Figure 6:
FIG. 6 shows images obtained as a result of image processing performed when sunlight is frontlight and backlight for a camera under the same conditions according to the example embodiment of FIG. 5.

In addition, when applying an image processing technology to minimize such a conventional rainbow phenomenon that may occur in the image obtained through the camera 312, including the lens 51 in which the polarizing filter 53 is applied to the preset lower end of the front or rear portion as shown in FIG. 5, resulting images may be output as shown in FIG. 6.

FIG. 6 shows images obtained as a result of image processing performed when sunlight is frontlight (i.e., key light or primary light) and backlight for the camera 312 under the same conditions (or tuning conditions) according to the example embodiment of FIG. 5.

Referring to view (a) of FIG. 6, when sunlight is frontlight for the camera 312, it is verified that a rainbow phenomenon does not appear on a bottom surface of an obtained image.

In contrast, referring to view (b) of FIG. 6, when sunlight is backlight for the camera 312, it is verified that a rainbow phenomenon appears on a bottom surface of an obtained image.

Accordingly, according to an example embodiment of the present disclosure, image processing may be performed on an obtained image according to the related art when sunlight is frontlight for the camera 312, and an operation of changing a color attribute of an obtained image may be performed when the sunlight is backlight for the camera 312 in order to minimize a rainbow phenomenon. The operation of changing a color attribute of an obtained image to minimize a rainbow phenomenon is described in detail below with reference to FIGS. 7-10.

Figure 7:
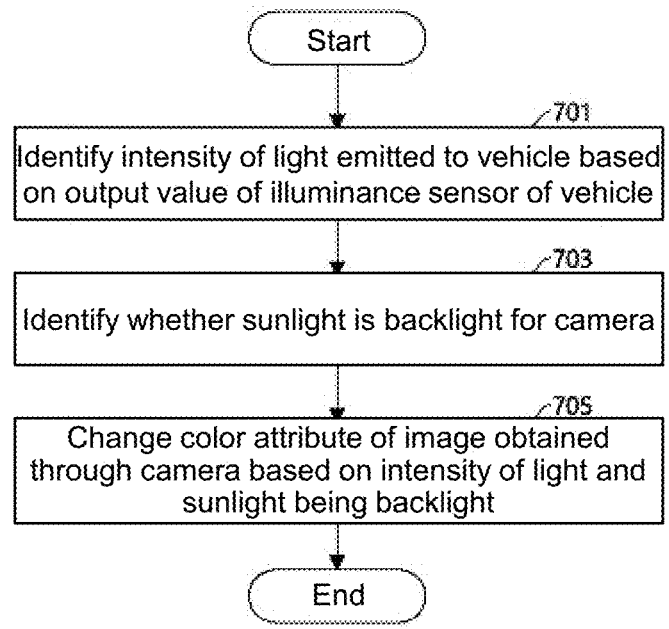
FIG. 7 is a flowchart illustrating a flow of operations performed by a controller of a vehicle according to an example embodiment.

FIG. 7 is a flowchart illustrating a flow of operations performed by the image processing system 30 (or the controller 350) of the vehicle 3 according to an example embodiment.

Figure 8:
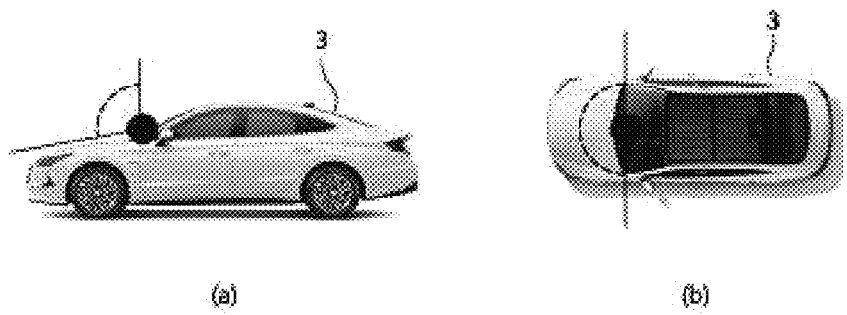
FIGS. 8 and 9 illustrate the determination of the presence or absence of backlight of sunlight according to an example embodiment.
Figure 9:
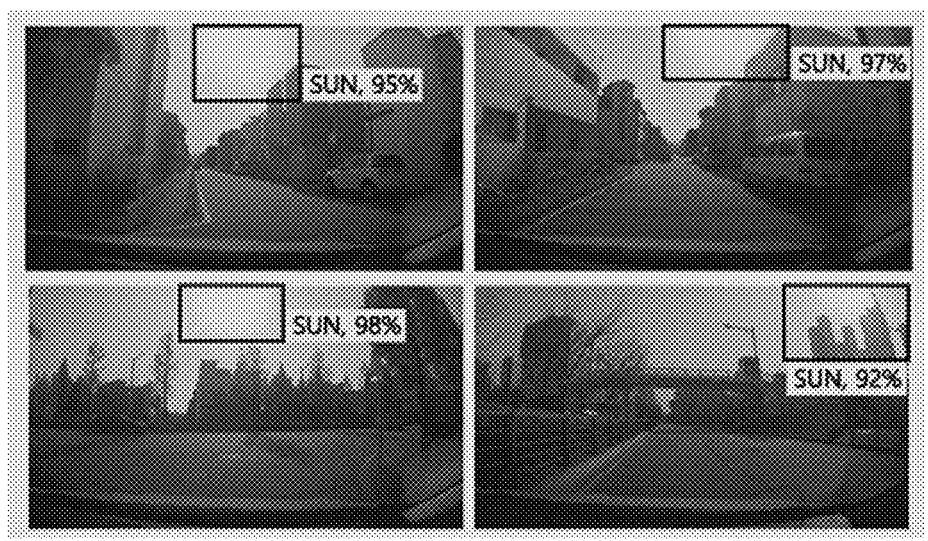

FIGS. 8 and 9 illustrate the determination of the presence or absence of backlight of sunlight according to an example embodiment.

Referring to FIG. 7, in operation 701, the image processing system 30 may identify an intensity of light emitted to the vehicle 3 based on an output value of the illuminance sensor 320 of the vehicle 3.

The illuminance sensor 320 may output an intensity of illuminance, i.e., the intensity of light, as one or more numbers from 0 to 255. The illuminance sensor 320 may have different ranges of such numbers for each manufacturer and may set 0 as a maximum illuminance value.

In operation 703, the image processing system 30 may identify whether sunlight is backlight for the camera 312, based on an output value of the sunlight sensor 330 of the vehicle 3 and/or an image obtained through the camera 312 of the vehicle 3.

A polarizing filter may be applied to the camera 312. For example, the polarizing filter 53 may be applied to the camera 312 as shown in FIG. 5.

The image processing system 30 may determine whether the sunlight is emitted within a preset angle range (or a preset angle) of the vehicle 3 based on the output value of the sunlight sensor 330 and may determine that the sunlight is backlight for the camera 312 when the sunlight is emitted within the preset angle range of the vehicle 3.

Referring to FIG. 8, the preset angle range may be set based on any one portion of the vehicle 3.

For example, as shown in view (a) of FIG. 8, a maximum sensing angle in a vertical direction with respect to an imaginary horizontal line of any one portion of the windshield glass of the vehicle 3 may be preset to be 100 degrees (°), and 10° may be preset downward with respect to the imaginary horizontal line and 90° may be preset upward with respect to the imaginary horizontal line.

In addition, as shown in view (b) of FIG. 8, a maximum sensing angle in a horizontal direction with respect to any one portion of the windshield glass of the vehicle 3 may be preset to be 180°.

The image processing system 30 may determine whether the sun is included in the obtained image based on an object detection algorithm (also referred to as a deep learning algorithm) and may determine that the sunlight is backlight for the camera 312 when the sun is included in the image.

For example, the object detection algorithm may be trained in advance based on a fact that an image pixel value of the sun is close to 255 and the sun is in a circular shape. Accordingly, the image processing system may identify pixel values of the image through the object detection algorithm, and may identify whether the pixel values close to 255, i.e., pixel values included in a preset value range, form the circular shape. When the pixel values included in the preset value range are identified to form the circular shape, the image processing system 30 may determine that the sun is included in the image.

For example, referring to FIG. 9, the image processing system 30 may derive probability results (e.g., sun 95%, sun 97%, sun 98%, sun 92%) indicating probabilities that the images shown in FIG. 9 obtained through the camera 312 include the sun, through the object detection algorithm. In addition, when a probability result is greater than or equal to a preset threshold value, the image processing system 30 may determine that a corresponding image includes the sun and may determine that the sunlight is backlight for the camera 312.

In operation 705, the image processing system 30 may change a color attribute of the image obtained through the driving image recording system 310 based on the intensity of light and the sunlight being backlight.

The example embodiments described herein are to solve an issue arising when sunlight is emitted to the vehicle 3, and thus a first threshold value (or also referred to as a threshold value) for determining whether the sunlight is emitted may be set in advance, and the image processing system 30 may perform an operation of changing the color attribute of the image only when an output value of the illuminance sensor 320, i.e., the intensity of light, is greater than the preset first threshold value.

For example, when the first threshold value is set to 100, the image processing system 30 may determine, to be a condition under which the sunlight is emitted, a case in which the output value of the illuminance sensor 320, i.e., the intensity of light, is greater than 100, and may then perform the operation of changing the color attribute of the image.

In addition, the example embodiments described herein are to solve an issue of a rainbow phenomenon that may occur (or worsen) in the camera 312 to which a polarizing filter is applied as the sunlight is emitted as backlight to the vehicle 3, and thus the operation of changing the color attribute of the image may be performed only when the sunlight is backlight for the camera 312.

Accordingly, according to an example embodiment of the present disclosure, when the intensity of light is greater than the preset first threshold value and the sunlight is emitted as backlight to the vehicle 3, the operation of changing the color attribute of the image may be performed.

The changing of the color attribute of the image may include reducing saturation of at least a portion of the image.

The at least a portion of the image may be, for example, a portion of the image corresponding to a portion on which a polarizing filter of a lens of the camera 312 is arranged. For example, this portion of the image may be a lower end of the image corresponding to a lower end at which the polarizing filter 53 is arranged when the polarizing filter 53 is applied to a preset lower end of a front or rear surface portion of the lens 51 of the camera 312 as shown in FIG. 5, i.e., a portion in which a rainbow phenomenon occurs according to the related art.

For example, the image processing system 30 may reduce the saturation of this portion of the image by reducing, by a preset ratio or value, a color value of pixels of the image corresponding to each of one or more colors predefined in a red, green, blue (RGB) color system.

The one or more colors predefined in the RGB color system may include, for example, red, blue, green, magenta, yellow, cyan, and/or white, and a color value range of each of the colors may be from −127 to 127 (a total of 256).

In addition to the foregoing example described above with reference to FIG. 7, considering that a rainbow phenomenon does not occur by the application of a polarizing filter to the camera 312 when it is nighttime when the sun is not visible, the image processing system 30 may not perform operations (e.g., operations 701, 703, and 705) for changing the color attribute of the image at the nighttime (e.g., after 8:00 pm).

For example, the image processing system 30 may identify a current time, and may not perform the foregoing operations (e.g., operations 701, 703, and 705) for changing the color attribute of the image when the current time is included in a preset nighttime range. In addition, when the current time is not included in the preset nighttime range, the image processing system 30 may perform the foregoing operations (e.g., operations 701, 703, and 705) for changing the color attribute of the image.

For example, when the current time is included in a preset daytime range, the image processing system 30 may perform the foregoing operations (e.g., operations 701, 703, and 705) for changing the color attribute of the image. In addition, when the current time is not included in the preset daytime range, the image processing system 30 may not perform the foregoing operations (e.g., operations 701, 703, and 705) for changing the color attribute of the image.

Figure 10:
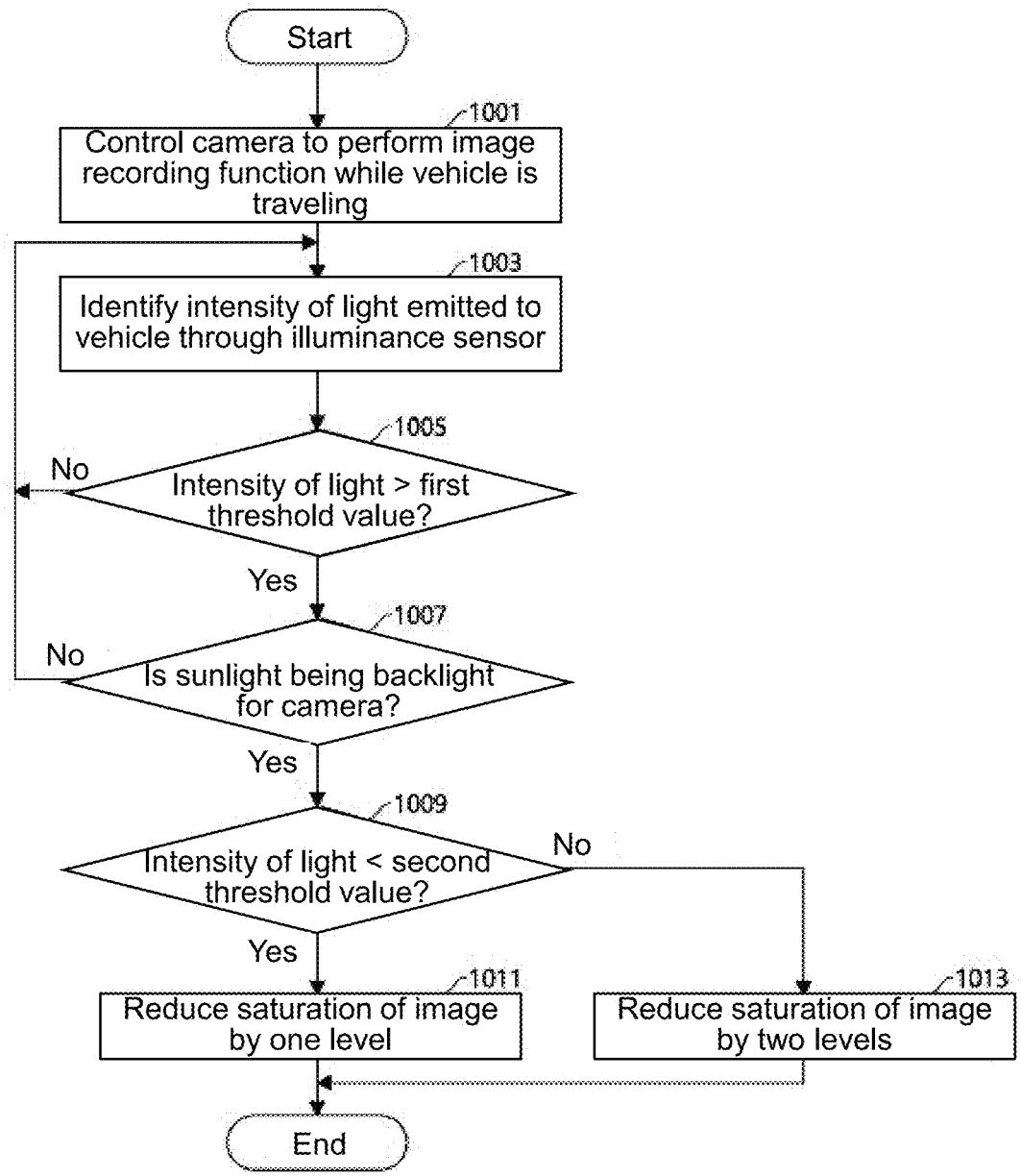
FIG. 10 is a flowchart illustrating a flow of operations performed by a controller of a vehicle according to an example embodiment.

FIG. 10 is a flowchart illustrating a flow of operations performed by the image processing system 30 (or the controller 350) of the vehicle 3 according to an example embodiment.

Referring to FIG. 10, when the sun corresponds to backlight for the camera 312, the image processing system 30 may change, by levels, the color attribute, i.e., saturation (or color), according to the intensity of light.

In operation 1001, the image processing system 30 may control the camera 312 to perform an image recording function while the vehicle 3 is traveling.

A polarizing filter may be applied to the camera 312. For example, the polarizing filter 53 may be applied to the camera 312 as shown in FIG. 5.

For example, the image processing system 30 may store initial setting values (or default values) of colors in the RGB color system for image processing of the camera 312 as shown in Table 1 below, and may apply the initial setting values to the image obtained through the camera 312.

TABLE 1

| Number | Color | Value |
| --- | --- | --- |
| 1 | Red | 0 |
| 2 | Blue | 0 |
| 3 | Green | 0 |
| 4 | Magenta | 0 |
| 5 | Yellow | 0 |
| 6 | Cyan | 0 |
| 7 | White | 0 |

In operation 1003, the image processing system 30 may identify, or monitor, an intensity of light emitted to the vehicle 3 through the illuminance sensor 320.

For example, the image processing system 30 may identify an intensity of light emitted to the vehicle 3 through the illuminance sensor 320 at preset time intervals.

In operation 1005, the image processing system 30 may identify whether the intensity of the light is greater than a preset first threshold value.

The image processing system 30 may perform operation 1007 when the intensity of the light is greater than the first threshold value, or otherwise perform operation 1003 again.

In operation 1007, the image processing system 30 may identify whether sunlight is backlight for the camera 312 of the vehicle 3.

The image processing system 30 may perform operation 1009 when the sunlight is backlight for the camera 312 of the vehicle 3, or otherwise perform operation 1003 again.

Operations 1005 and 1007 may be performed to determine in advance a condition under which a rainbow phenomenon may occur when a polarizing filter (e.g., the polarizing filter 53 of FIG. 5) is applied to the camera 312. Accordingly, the image processing system 30 may perform operations 1005 and 1007 to determine whether the condition under which the rainbow occurs is met and may then perform operation 1009 when the condition is met.

In operation 1009, the image processing system 30 may identify whether the intensity of the light is less than a preset second threshold value.

The image processing system 30 may perform operation 1011 when the intensity of the light is less than the second threshold value, or otherwise perform operation 1013.

In operation 1011, the image processing system 30 may reduce saturation of the image by one level.

For example, the image processing system 30 may store, as shown in Table 2 below, color values and color ratios (or first values and first ratios) in the RGB color system for image processing of the camera 312 to be used to reduce the image saturation by one level (also, first-step color correction) when the intensity of the light is less than the second threshold value.

TABLE 2

| Number | Color | Value (ratio) |
|---|---|---|
| 1 | Red | −51 (−40%) |
| 2 | Blue | −51 (−40%) |
| 3 | Green | −38 (−30%) |
| 4 | Magenta | 0 |
| 5 | Yellow | −77 (−60%) |
| 6 | Cyan | 0 |
| 7 | White | 0 |

The image processing system 30 may reduce the saturation of the image by one level by applying the values or ratios in Table 2 to the image, and may finally generate an image in which a rainbow phenomenon does not appear.

For example, the image processing system 30 may reduce the color values through summation of color values of pixels corresponding to each of the colors in Table 2 in the image obtained through the camera 312 and the values defined in Table 2 (or through reduction by the ratios defined in Table 2).

In operation 1013, the image processing system 30 may reduce the saturation of the image by two levels.

For example, the image processing system 30 may store, as shown in Table 3 below, color values and color ratios (or second values and second ratios) in the RGB color system for image processing of the camera 312 to be used to reduce the image saturation by two levels (also, two-step color correction) when the intensity of the light is greater than or equal to the second threshold value.

TABLE 3

| Number | Color | Value (ratio) |
|---|---|---|
| 1 | Red | −90 (−70%) |
| 2 | Blue | −64 (−50%) |
| 3 | Green | −51 (−40%) |
| 4 | Magenta | 0 |
| 5 | Yellow | −90 (−70%) |
| 6 | Cyan | 0 |
| 7 | White | 0 |

The image processing system 30 may apply the values or ratios in Table 3 to the image to reduce the saturation of the image by two levels, and may finally generate an image in which a rainbow phenomenon does not appear.

For example, the image processing system 30 may reduce the color values through summation of color values of pixels corresponding to each of the colors in Table 3 in the image obtained through the camera 312 and the values defined in Table 3 (or through reduction by the ratios defined in Table 3).

Although it has been described above with reference to FIG. 10 that operation 1013 is performed when the intensity of the light is greater than or equal to the second threshold value, it may also be performed when the intensity of the light is greater than or equal to the second threshold value and less than a preset third threshold value, according to another example embodiment.

In addition, the foregoing operations described above with reference to FIGS. 7 and 10 may be performed during the execution of the recording function of the camera 312 while the vehicle 3 is traveling and may be performed for image processing on the image obtained through the camera 312. Accordingly, when sunlight is backlight for the vehicle 3 that is traveling, the image processing system 30 of the vehicle 3 may adjust saturation of at least a portion of the image to minimize a rainbow pattern. In addition, when the sunlight is frontlight for the vehicle 3, the image processing system 30 of the vehicle 3 may maximally realize an attribute of an actual color corresponding to a color of the image.

Figure 11:
FIG. 11 shows images obtained as a result of image processing according to an example embodiment.

FIG. 11 shows images obtained as a result of image processing according to an example embodiment.

Referring to view (a) of FIG. 11, when initial setting values of colors for image processing of the camera 312 are applied to an image that is obtained through the camera 312 when an intensity of light is greater than or equal to a first threshold value and the sun is backlight for the camera 312, a rainbow pattern may be included in an image as shown in view (a) of FIG. 11.

In contrast, referring to view (b) of FIG. 11, when a first value (or first ratio) of a color for image processing of the camera 312 is applied to an image that is obtained through the camera 312 when an intensity of light is greater than or equal to a first threshold value and the sun is backlight for the camera 312, or when a second value (or second ratio) of a color for image processing of the camera 312 is applied to the image obtained through the camera 312, a rainbow pattern may not be included in an image as shown in view (b) of FIG. 11.

In the present disclosure, the controller 350 may comprise one or more processors which perform the functionalities described above by executing a sequence or set of instructions (e.g. one or more computer programs) which is stored in a computer-readable memory for the functionalities.

The above-described embodiments may be implemented in the form of a recording medium storing instructions executable by a computer. Instructions may be stored in the form of program code, and when executed by a processor, may generate program modules to perform operations of the disclosed embodiments. The recording medium may be implemented as a computer-readable recording medium.

The computer-readable recording medium includes any type of recording medium in which instructions readable by the computer are stored. For example, there may be a read-only memory (ROM), a random-access memory (RAM), a magnetic tape, a magnetic disk, a flash memory, an optical data storage device, and the like.

As described above, the disclosed embodiments have been described with reference to the accompanying drawings. Those of ordinary skill in the art to which the present disclosure pertains will understand that the present disclo-

What is claimed is:

1. An image processing method that is performed in a vehicle by a processor executing a program stored in a computer-readable recording medium, the image processing method comprising:
   identifying an intensity of light emitted to the vehicle based on an output value of an illuminance sensor of the vehicle;
   obtaining an image through a camera of the vehicle;
   identifying whether sunlight is backlight for the camera of the vehicle, based on at least one of an output value of a sunlight sensor of the vehicle or the image obtained through the camera of the vehicle; and
   changing a color attribute of the image based on the intensity of the light and the sunlight being backlight,
   wherein a polarizing filter is arranged on a front surface portion or a rear surface portion of a lens of the camera such that the polarizing filter is applied to a preset lower end portion of the front surface portion or a preset lower end portion of the rear surface portion,
   wherein the changing the color attribute of the image comprises:
      reducing saturation of the image based on a comparison result of the intensity of the light and a preset second threshold value,
   wherein the reducing the saturation comprises:
      when the intensity of the light is less than the preset second threshold value, reducing the saturation of the image by one level; and
      when the intensity of the light is greater than or equal to the preset second threshold value, reducing the saturation of the image by two levels,
   wherein the saturation of the image is reduced by reducing, by a preset ratio or a preset value, a color value of each pixel of the image corresponding to each of one or more predefined colors,
   wherein the reducing by one level is performed by reducing a color value of each pixel of the image corresponding to each of the predefined colors by a preset first ratio or first value, and
   the reducing by two levels is performed by reducing a color value of each pixel of the image corresponding to each of the predefined colors by a preset second ratio or second value, and
   wherein an absolute value of the preset first ratio or first value is less than an absolute value of the preset second ratio or second value.

2. The image processing method of claim 1, wherein the identifying whether the sunlight is the backlight for the camera comprises:
   determining whether the sunlight is emitted within a preset angle range of the vehicle, based on the output value of the sunlight sensor; and
   when the sunlight is emitted within the preset angle range of the vehicle, determining that the sunlight is the backlight for the camera.

3. The image processing method of claim 1, wherein the identifying whether the sunlight is the backlight for the camera comprises:
   determining whether a sun is included in the image based on an object detection algorithm; and
   when the sun is included in the image, determining that the sunlight is the backlight for the camera.

4. The image processing method of claim 1, wherein the changing the color attribute of the image comprises:
   determining whether the intensity of the light is greater than a preset first threshold value; and
   changing the color attribute of the image when the intensity of the light is greater than the preset first threshold value.

5. The image processing method of claim 1, wherein the predefined colors comprise at least one of red, blue, green, magenta, yellow, cyan, or white, in a red, blue, green (RGB) color system.

6. The image processing method of claim 1, wherein the changing of the color attribute of the image is performed when a current point of time is out of a preset nighttime range.

7. An image processing system of a vehicle, the image processing system comprising:
   an illuminance sensor;
   a sunlight sensor;
   a camera configured to obtain an image around the vehicle; and
   a controller configured to identify an intensity of light emitted to the vehicle based on an output value of the illuminance sensor, identify whether sunlight is backlight for the camera based on at least one of an output value of the sunlight sensor or the image, and change a color attribute of the image based on the sunlight when the sunlight is the backlight for the camera,
   wherein a polarizing filter is arranged on a front surface portion or a rear surface portion of a lens of the camera such that the polarizing filter is applied to a preset lower end portion of the front surface portion or a preset lower end portion of the rear surface portion,
   wherein the controller is further configured to:
      reduce saturation of the image based on a comparison result of the intensity of the light and a preset second threshold value,
      reduce the saturation of the image by reducing, by a preset ratio or value, a color value of each pixel of the image corresponding to each of one or more predefined colors,
      when the intensity of the light is less than the preset second threshold value, reduce the saturation of the image by one level by reducing a color value of each pixel of the image corresponding to each of the predefined colors by a preset first ratio or first value; and
      when the intensity of the light is greater than or equal to the preset second threshold value, reduce the saturation of the image by two levels by reducing a color value of each pixel of the image corresponding to each of the predefined colors by a preset second ratio or second value, and
   wherein an absolute value of the preset first ratio or first value is less than an absolute value of the preset second ratio or second value.

8. The image processing system of claim 7, wherein the controller is further configured to:
   determine whether the sunlight is emitted within a preset angle range of the vehicle based on the output value of the sunlight sensor, and when the sunlight is emitted within the preset angle range, determine that the sunlight is the backlight for the camera.

9. The image processing system of claim 7, wherein the controller is further configured to:

determine whether a sun is included in the image based on an object detection algorithm, and when the sun is included in the image, determine that the sunlight is the backlight for the camera.

10. The image processing system of claim 7, wherein the controller is further configured to:
determine whether the intensity of the light is greater than a preset first threshold value, and change the color attribute of the image when the intensity is greater than the preset first threshold value.

11. The image processing system of claim 7, wherein the predefined colors comprise at least one of red, blue, green, magenta, yellow, cyan, or white, in a red, blue, green (RGB) color system.

12. The image processing system of claim 7, wherein the controller is further configured to:
change the color attribute of the image when a current point of time is out of a preset nighttime range.

\* \* \* \* \*